United States Patent Office 3,354,378
Patented Nov. 21, 1967

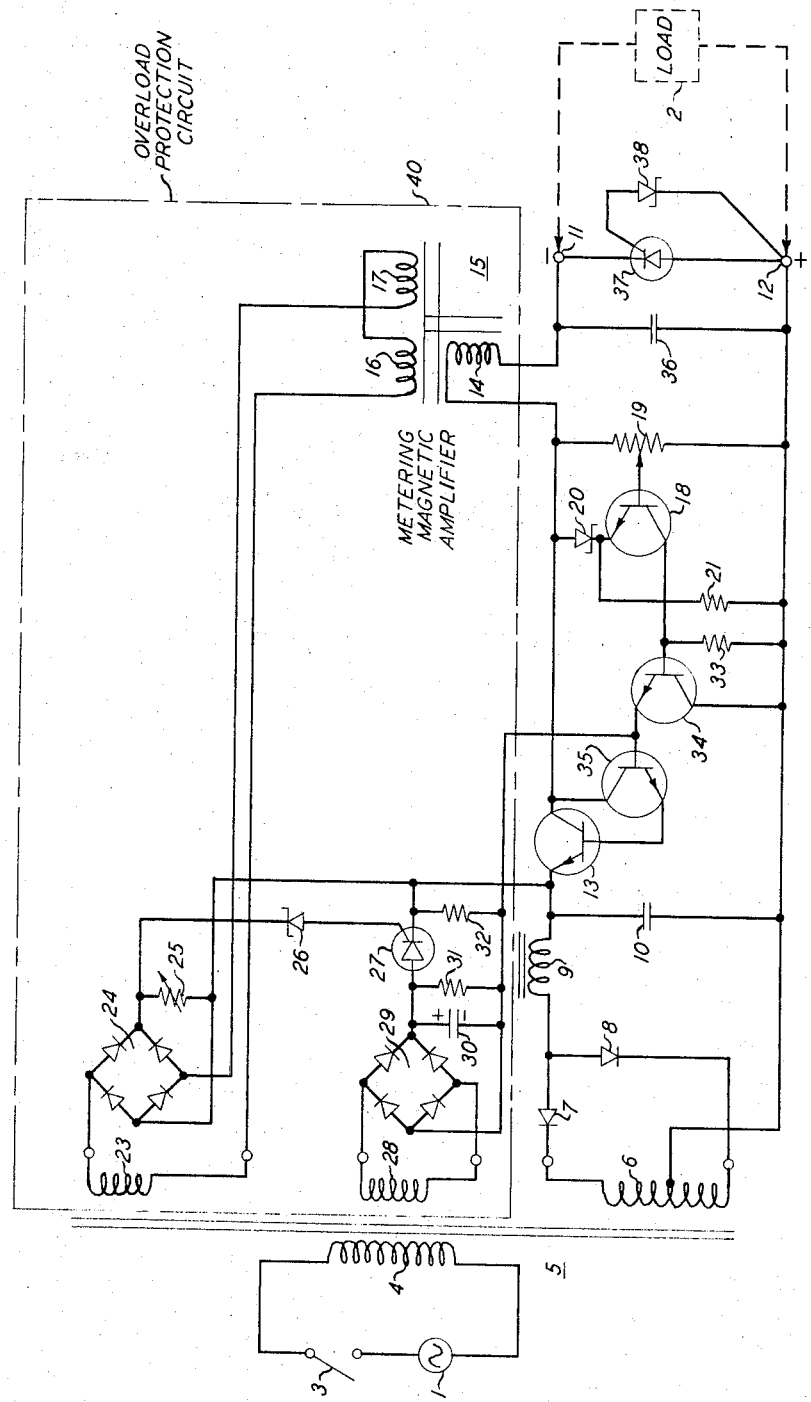

3,354,378
REGULATED POWER SUPPLY WITH OVERLOAD AND OVERVOLTAGE PROTECTION
William E. Jewett, Basking Ridge, N.J., assignor to Bell Telephone Laboratories, Incorporated, New York, N.Y., a corporation of New York
Filed Dec. 8, 1964, Ser. No. 416,838
6 Claims. (Cl. 321—14)

ABSTRACT OF THE DISCLOSURE

A variable impedance series transistor power supply with a controlled rectifier protection network that reverse biases the series regulating transistor in the event of an overload or overvoltage condition.

This invention relates to a protective circuit for a series transistor regulated power supply.

Protection against overload and overvoltage in power supplies regulated by a series transistor operating in the continuously variable impedance mode has been a chronic problem although such power supplies have become widely used. In particular, an overload will sometimes draw a current that is great enough to destroy the series transistor, even though there is no short-circuit condition at the output terminals. Thus, a need for accurate sensing of the load current is apparent. Moreover, such an overload condition may occur so rapidly that a fuse cannot be blown or a circuit breaker opened fast enough to protect the series transistor.

While fast-acting circuits for shutting down a transistor regulated power supply are known, many of them allow the power supply to resume operation after a brief interval, further endangering the series transistor. Others are contrived to keep the power supply shut down, but are too complicated and critical in adjustment to provide a reliable circuit capable of wide use. Such circuits are generally made even more complicated when overvoltage protection is combined with overload protection.

Accordingly, it is an object of this invention to sense overload conditions in a series transistor regulated power supply accurately and rapidly and to shut down the power supply and keep it shut down in order to protect the series transistor.

A further object of the invention is to provide a simple, reliable circuit for protecting such a power supply against overloads.

Still another object of the invention is to provide a simple and reliable way of combining overvoltage protection with overload protection in such a power supply.

According to the invention, the rapid response and inherent "holding circuit" characteristics of a semiconductor controlled rectifier are utilized to reverse-bias the series regulating transistor and to maintain it reversed-biased after an overload condition has been detected. The load current is preferably sensed by a circuit that triggers the control path of the semiconductor controlled rectifier through a voltage reference device such as a Zener diode. A separate source of voltage is applied across the principal current path of the semiconductor controlled rectifier to maintain the latter conductive after it is triggered even though the reverse-biasing of the series regulating transistor has removed the triggering signal from the control path of the semiconductor controlled rectifier.

According to a feature of the invention, simple and reliable overvoltage protection is provided by connecting the control path of a second semiconductor controlled rectifier through a voltage reference device across the load in a polarity to trigger the second semiconductor controlled rectifier whenever the output voltage becomes excessive. The principal current path of the second semiconductor controlled rectifier is connected across the load and is adapted whenever triggered to draw a current that will cause a metering magnetic amplifier to trigger the first semiconductor controlled rectifier. In addition to great simplicity, this arrangement has the advantage that it permits substantial variation of the load current level which produces shutdown of the power supply without affecting the load voltage level which produces shutdown of the power supply.

Further features and advantages of the invention will become apparent from the following detailed description and the drawing, in which the single figure is a schematic circuit diagram of a preferred embodiment of the invention.

From a source 1 of alternating current, it is desired to supply a regulated direct-current voltage to a load 2. Source 1 is connected through a switch 3 across the primary winding 4 of a transformer 5. A secondary winding 6 of the transformer is connected across a full-wave rectifier and filter comprising diodes 7 and 8, filter inductor 9 and filter capacitor 10. Specifically, the cathodes of rectifier diodes 7 and 8 are connected to the end terminals of the secondary winding 6, and their anodes are connected together to one terminal of filter inductor 9. A filter capacitor 10 is connected between the other terminal of inductor 9 and the center tap of winding 6, which is common with output terminal 12. The emitter electrode of an NPN transistor 13 is connected to the junction of filter inductor 9 and capacitor 10 and its collector electrode is connected through a primary winding 14 of a metering magnetic amplifier 15 to output terminal 11.

Load 2 is connected between output terminals 11 and 12 and a filter capacitor 36 is connected across output terminals 11 and 12 of the regulator and together with filter capacitor 10 and regulating transistor 13 forms a $\pi$-type filter.

The transistor 13 is a semiconductor regulating element, its emitter and collector electrodes comprising its principal current path that is controlled by its control current path, which comprises its base and emitter electrodes. The impedance between the collector and emitter electrodes of the transistor 13 is inversely related to the current flowing between its base and emitter electrodes, as supplied through the transistors 34 and 35, connected as shown. This current in turn is inversely related to the output voltage between terminals 11 and 12, which is sensed by a transistor 18. The transistor 18, which constitutes the usual comparator amplifier, compares a portion of the output voltage with a reference voltage derived from a Zener diode 20, which is connected to be continuously conducting in its Zener direction.

Thus, transistors 18, 34, 35 and regulating transistor 13 comprise a negative feedback circuit operating in the continuously variable impedance mode well known in the art to oppose changes in the output voltage. Since transistors 13 and 35 each carry part of the output current, they are particularly vulnerable to damage by overload currents and also by excessive output voltages at moderate load currents, since the latter condition may cause them to dissipate excessive amounts of power as they increase impedance to oppose the rise in output voltage.

Accordingly, there are provided an overload protective circuit 40 and an overvoltage protective circuit comprising elements 37 and 38 and operating through overload protective circuit 40.

Specifically, in overload protection circuit 40, metering magnetic amplifier 15 is a saturable reactor operating in the so-called proportional mode. That is, the square-wave current in the secondary windings 16 and 17 is substantially proportional in magnitude to the direct current in the primary winding 14. The operation of metering magnetic amplifier 15 depends on the fact that two portions of the magnetic core material alternate between saturated and unsaturated conditions, one portion being saturated with magnetic flux while the other is unsaturated and vice versa. A more complete description of magnetic amplifiers or saturable reactors suitable for operation in this mode may be found in the article "Observation of Transients in the Series Connected Saturable Reactors With High Impedance Control Source," by H. L. Goldstein in A.I.E.E. Transactions, Communications and Electronics, vol. 78, Part I, November 1959, pp. 521–526.

It should be noted that auxiliary winding 23 on transformer 5 supplies a voltage of the appropriate magnitude to keep metering magnetic amplifier operating in the proportion mode.

Windings 16 and 17 of the metering magnetic amplifier 15 are connected serially with winding 23 across the input of full-wave rectifier 24; and the variable potentiometer 25 is connected across the output of full-wave rectifier 24 and forms part of the output circuit of rectifier 24. It may be seen that potentiometer 25 draws all of its net power directly from the input circuit rather than from the output of the regulator circuit through transistor 13.

The output of rectifier 24, appearing across potentiometer 25, is connected across the control path of a semiconductor controlled rectifier (SCR) 27 through a Zener diode 26 in a polarity to trigger SCR27 into a conducting state whenever the voltage across potentiometer 25 exceeds the Zener breakdown voltage of diode 26. It is noted that Zener diode 26 is connected in opposing polarity, i.e., cathode-to-cathode, to the diodes of full-wave rectifier 24.

The principal current path of semiconductor controlled rectifier 27 and the resistor 32 are connected serially across the output of a full-wave rectifier 29; and the input of full-wave rectifier 29 is connected across an auxiliary winding 28 of transformer 5. It is noted that the principal current path of SCR27 is connected in like polarity, i.e., anode-to-cathode, to the diodes of full-wave rectifier 29. A capacitor 30 is connected across the output of full-wave rectifier 29 to filter the rectified voltage that is applied across the principal current path of SCR27 and resistor 32. A resistor 31 is connected in parallel with capacitor 30 and moderates the change in D.C. voltage level that occurs when SCR27 is fired, placing resistor 32 in shunt with resistor 31.

The overload protection circuit 40 is completed by applying the voltage across resistor 32 between the emitter electrode of transistor 13 and the base electrode of transistor 35 in a polarity to reverse bias the base-emitter junctions of transistors 13 and 35 whenever SCR27 is fired. Thus, the junction of the cathodes of the diodes in rectifier 29 is connected through the anode and cathode of SCR27 to the emitter electrode of NPN regulating transistor 13; and the junction of the anodes of the diodes in rectifier 29 is connected to the base electrode of NPN transistor 35.

The overvoltage protective network comprises semiconductor controlled rectifier 37 and Zener diode 38. Semiconductor controlled rectifier 37 has its cathode connected to output terminal 11 and its anode connected to output terminal 12, whereby SCR37 shunts output terminals 11 and 12 whenever triggered. Its control electrode is connected to the anode of a Zener diode 38; and the cathode of Zener diode 38 is connected to output terminal 12.

In operation, the rectified input voltage appearing across capacitor 10 is applied across load 2, winding 14 of metering magnetic amplifier 15 and the collector-emitter path of regulating transistor 13 in series. The voltage between terminals 11 and 12 also appears across resistor 19, and a portion of it, minus the Zener voltage of Zener diode 20, is applied across the base-emitter junction of comparator transistor 18. If, for example, the output voltage tends to decrease, the base current of transistor 18 is diminished. The decreased voltage drop across resistor 33 causes the base currents of transistors 34, 35 and 13 to increase, thereby decreasing the collector-to-emitter impedance of transistor 13 and applying a greater portion of the voltage of capacitor 10 between the output terminals 11 and 12. Similarly, if the output voltage tends to rise, the collector-to-emitter impedance of transistor 13 will be increased to oppose that tendency of the output voltage.

The output direct current flows through winding 14 of metering magnetic amplifier 15. This current in cooperation with the voltage supplied by winding 23 produces a square wave of current in windings 16 and 17 that is proportional in magnitude to the current in winding 14. The current flowing in windings 16, 17 and 23 is rectified by full-wave rectifier 24 and flows through potentiometer 25 to produce a voltage proportional to the current flowing in winding 14. The potentiometer 25 is adjusted so that the maximum permissible output current is slightly less than sufficient to break down the Zener diode 26. If the output current increases above this maximum current, Zener diode 26 breaks down, firing semiconductor controlled rectifier 27.

The rectified voltage across capacitor 30 and resistor 31 is then applied across resistor 32 and also across the series-connected base-emitter junctions of transistors 13 and 35 to reverse bias those base-emitter junctions and prevent conduction from the collector to the emitter of transistors 13 and 35. Load 2 is thus effectively disconnected from source 1.

The magnitude of the rectified voltage across capacitor 30 and the value of resistor 32 are chosen so that SCR27 will stably remain conducting. This inherent holding circuit characteristic of SCR27 prevents damage to regulating transistor 13, as might well occur if the power supply were permitted to turn on again after being shut down by an overload condition.

If the series regulating transistor 13 cannot keep the output voltage from becoming excessive because, for example, of a rising input voltage, it is again desirable that the power supply be shut down. The particular voltage at which the output voltage becomes excessive is set by Zener diode 38 and as a practical matter would be determined by connecting several Zener diodes of appropriate breakdown voltage value in the position of Zener diode 38. When this particular voltage is exceeded, Zener diode 38 breaks down firing SCR37, which then draws a sufficiently large current through winding 14 of metering magnetic amplifier 15 to cause the overload protection circuit 40 to fire SCR27 and reverse bias transistors 13 and 35, as described hereinbefore. This arrangement for shunting the output terminals 11 and 12 to utilize the overload protection circuit for the additional purpose of overvoltage protection has the merit of design simplicity, and yet, the power drawn from the power supply circuit by Zener diode 38 and SCR37 is very brief in duration because of the high speed of response of overload protection circuit 40.

What is claimed is:

1. In a power supply of the type wherein a source of alternating-current voltage is applied through a first rectifier and a semiconductor regulating element to a pair of output terminals to supply a current to a load, a protective circuit comprising a magnetic amplifier having a primary winding connected serially with said regulating element to carry a current flowing to said output terminals and having a secondary winding, a second rectifier and means for coupling said source of alternating-current voltage serially across said secondary winding of said magnetic amplifier and said second rectifier to produce a rectified voltage directly related to the current flowing through said primary winding of said magnetic amplifier, a semiconductor controlled rectifier having a principal current path and a control current path, a Zener diode connected serially with said control current path across said second rectifier in a polarity to conduct in its Zener direction when said rectified voltage exceeds a maximum value, a third rectifier, means for coupling said source of alternating current voltage across said third rectifier to produce a rectified current, means for connecting said principal current path to said third rectifier to receive a rectified current after said Zener diode conducts, said rectified current stably exceeding the inherent holding current of said semiconductor controlled rectifier, and means for applying said rectified current to reverse bias said semiconductor regulating element.

2. In a power supply, a protective circuit according to claim 1 including a second semiconductor controlled rectifier having a principal current path connected across said output terminals and having a control current path, and a voltage reference device connected serially with said control current path across said output terminals in a polarity to trigger said control current path when the voltage between said output terminals exceeds a particular value.

3. In a power supply of the type wherein a source of alternating-current voltage is applied through a transformer, a first rectifier and a semiconductor regulating element to a pair of output terminals to supply a current to said output terminals, a protective circuit comprising a metering magnetic amplifier having a primary winding connected serially with said regulating element to carry said current and having a secondary winding, a first auxiliary winding on said transformer and a second rectifier having an input coupled across said first auxiliary winding and said magnetic amplifier secondary winding in series and having an output circuit wherein a first rectified voltage substantially proportional to said current can be produced, a second auxiliary winding on said transformer and a third rectifier having an input coupled across said second auxilary winding and having an output circuit wherein a second rectified voltage can be produced, a Zener diode connected across said second rectifier output circuit in a polarity to conduct in its Zener direction whenever said first rectified voltage exceeds a predetermined level, a semiconductor controlled rectifier having a control current path connected serially with said Zener diode across said second rectifier output circuit and having a principal current path connected across said third rectifier output circuit to derive a holding current from said second rectified voltage after said Zener diode has conducted, said principal current path also being connected to said semiconductor regulating element in a polarity to reverse bias said semiconductor regulating element whenever said principal current path is conducting.

4. In a power supply, a protective circuit according to claim 3 including a second Zener diode connected across said output terminals in a polarity to conduct in its Zener direction whenever the voltage between said output terminals exceeds a particular level and a second semiconductor controlled rectifier having a control current path connected serially with said Zener diode between said output terminals and having a principal current path connected between said output terminals and adapted whenever conductive to draw to said output terminals a current in response to which the first rectified voltage exceeds the predetermined level.

5. A power supply comprising a semiconductor regulating element serially connected between a first source of voltage and a pair of output terminals to supply current from said first source to said output terminals, a semiconductor controlled rectifier having a principal current path from its anode to cathode electrodes and a gating current path including its cathode and gate electrodes, a protective circuit comprising current responsive means serially connected with said regulating element, said output terminals, and said first input source to produce a control signal proportional to the current flowing through said output terminals, means connecting said current responsive means to said gate and cathode electrodes to initiate conduction through the anode-cathode path of said controlled rectifier whenever the current delivered to said output terminals exceeds a predetermined magnitude, a second source of voltage connected to the anode and cathode electrodes of said controlled rectifier to sustain conduction through the principal current path of said controlled rectifier when conduction therethrough is initiated, and biasing means serially connected with the anode-cathode path of said controlled rectifier and said regulating element to reverse bias said regulating element whenever conduction through the principal current path of said controlled rectifier is initiated.

6. A power supply in accordance with claim 5 including means for shorting the output terminals when the voltage between said output terminals exceeds a particular value, said shorting means being adapted to draw a current having a magnitude greater than said predetermined magnitude through said output terminals, whereby conduction through the principal current path of said controlled rectifier is initiated and reverse bias is applied to said regulating element.

References Cited
UNITED STATES PATENTS

| 3,078,410 | 2/1963 | Thomas | 317—33 |
| 3,079,543 | 2/1963 | Decker | 317—33 |
| 3,096,475 | 7/1963 | Brooks | 317—33 |
| 3,163,814 | 12/1964 | Todd | 317—33 |
| 3,177,402 | 4/1965 | Muchnick | 317—33 |
| 3,218,542 | 11/1965 | Taylor | 317—33 |
| 3,258,603 | 6/1966 | Wright et al. | 307—86 |
| 3,260,916 | 7/1966 | Waltrous | 321—14 |

OTHER REFERENCES

IBM Technical Disclosure Bulletin, vol. 6, No. 12, May 1964, pp. 11–12.

JOHN F. COUCH, *Primary Examiner.*

M. L. WACHTELL, *Assistant Examiner.*